(Model.)

D. F. TROUT.
Lye Trough for Soap Makers.

No. 242,398.  Patented May 31, 1881.

WITNESSES:
A. Schehl.
C. Sedgwick

INVENTOR:
D. F. Trout
BY Munn & Co
ATTORNEYS.

United States Patent Office.

DANIEL F. TROUT, OF FEESBURG, OHIO.

LYE-TROUGH FOR SOAP-MAKERS.

SPECIFICATION forming part of Letters Patent No. 242,398, dated May 31, 1881.

Application filed April 13, 1881. (Model.)

*To all whom it may concern:*

Be it known that I, DANIEL F. TROUT, of Feesburg, Brown county, Ohio, have invented a new and Improved Lye-Trough for Soap-Makers, of which the following is a specification.

My invention consists of a lye trough or pan used in making soap, which is made of metal or wood, with a spout at one side or end, which is on a level with the bottom of the trough or pan.

Figure 1:
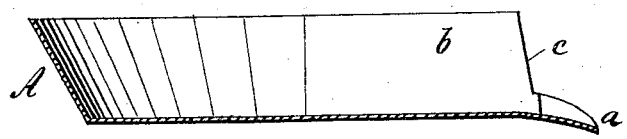
Figure 2:
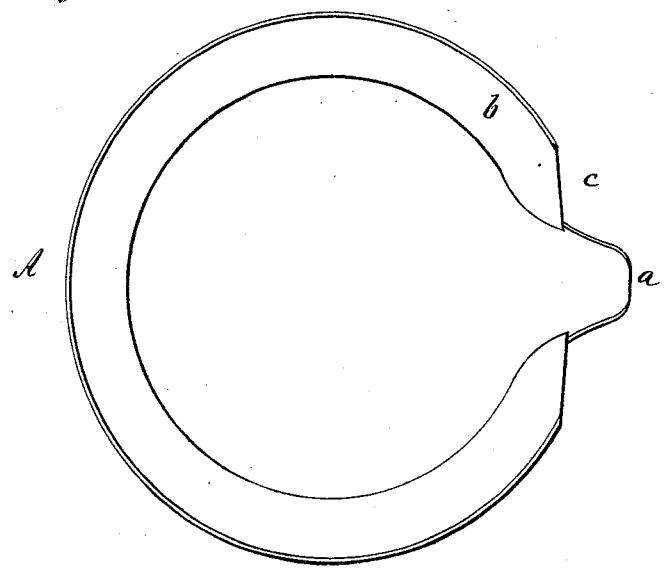

In the accompanying drawings, Figure 1 is a central vertical section of my invention, and Fig. 2 is a plan view thereof.

Similar letters of reference indicate corresponding parts.

The trough or pan A is preferably made of any kind of wood or metal, and is adapted to be placed under a barrel or ordinary board hopper, or other kind of leach-tub, to catch the lye as it comes from the leach-tub and conduct it over the bottom of the pan or trough, through the spout $a$, to some receptacle placed under the spout.

The spout $a$ is formed of the same piece of metal as the bottom of the trough or pan, and the flaring edges or rim $b$ of the pan or trough are cut away near the spout, as shown at $c$, to permit the lye to pass out of the trough.

Though I have shown the pan or trough circular in form, it is obvious that the same might be made in any other form and not depart from the spirit of my invention.

Having thus described my invention, I claim as new and desire to secure by Letters Patent—

The metal lye trough or pan herein shown and described, having the flaring rim $b$ and the spout $a$, which latter is on a level with the bottom of the trough or pan, substantially as and for the purposes specified.

DANIEL FRANCIS TROUT.

Witnesses:
J. L. BRANNOCK,
DANIEL TROUT.